United States Patent [19]

Stowe

[11] Patent Number: 4,590,997
[45] Date of Patent: May 27, 1986

[54] CONTROLLED PULSE AND PEROXIDE FRACTURING COMBINED WITH A METAL CONTAINING PROPPANT

[75] Inventor: Lawrence R. Stowe, Plano, Tex.

[73] Assignee: Mobil Oil Corporation, New York, N.Y.

[21] Appl. No.: 695,600

[22] Filed: Jan. 28, 1985

[51] Int. Cl.$^4$ .................. E21B 43/263; E21B 47/02
[52] U.S. Cl. .................. 166/250; 166/280; 166/299; 166/300; 166/308
[58] Field of Search .......... 166/250, 271, 259, 280, 166/299, 300, 308, 63; 299/4, 5, 13

[56] References Cited

U.S. PATENT DOCUMENTS

| | | | |
|---|---|---|---|
| 2,943,681 | 7/1960 | Barrett | 166/300 |
| 2,975,834 | 3/1961 | West et al. | 166/300 |
| 3,129,760 | 4/1964 | Gambill | 166/300 |
| 3,239,006 | 3/1966 | Fast | 166/280 |
| 3,242,988 | 3/1966 | McGuire, Jr. et al. | 166/280 |
| 3,270,813 | 9/1966 | Gilchrist | 166/280 X |
| 3,376,930 | 4/1968 | Kiel et al. | 166/280 |
| 3,896,879 | 7/1975 | Sareen et al. | 166/300 X |
| 4,039,030 | 8/1977 | Godfrey et al. | 166/299 |
| 4,548,252 | 10/1985 | Stowe et al. | 166/299 |

*Primary Examiner*—George A. Suchfield
*Attorney, Agent, or Firm*—Alexander J. McKillop; Michael G. Gilman; Charles A. Malone

[57] ABSTRACT

A method for extending fractures in underground formations obtained by controlled pulse fracturing through the use of a stabilized hydrogen peroxide solution. Controlled pulse fracturing causes radial fracturing near the wellbore. These radial fractures are further extended into the formation or reservoir when stabilized hydrogen peroxide is forced into the radial fractures. Stabilizing agents in the hydrogen peroxide react with metals mixed with a proppant in the formation causing the hydrogen peroxide to breakdown and form gas pressure sufficient to extend the radial fractures. Hydrocarbonaceous fluids are then obtained from the natural fractures in said formation via the extended fractures which contact natural fractures emanating from the wellbore.

27 Claims, No Drawings

CONTROLLED PULSE AND PEROXIDE FRACTURING COMBINED WITH A METAL CONTAINING PROPPANT

This application is related to application Ser. No. 596,492 filed April 4, 1984, now U.S. Pat. No. 4,548,252.

FIELD OF THE INVENTION

This invention is directed to a method for extending radial fractures obtained during controlled pulse fracturing of underground formations or reservoirs.

BACKGROUND OF THE INVENTION

It has been known for some time that the yield of hydrocarbons, such as gas and petroleum, from wells can be increased by fracturing the formation so as to stimulate the flow of hydrocarbons in the well. Various formation fracturing procedures have been proposed and many now are in use. Among these procedures are treatments with various chemicals (usually acids in aqueous solutions), hydraulic fracturing in which liquids are injected under high pressure (usually with propping agents), explosive methods in which explosives are detonated within the formations to effect mechanical fracture, and combinations of the above procedures.

Chemical treatments usually involve the use of large volumes of chemicals which can be expensive and difficult to handle, and which pose problems of contamination and disposal. Hydraulic fracturing ordinarily requires that large volumes of liquids be made available at the well site and that equipment be made available for handling these large volumes of liquid. Again, there can be disposal problems, as well as contamination of the well. Explosive methods can be exceptionally hazardous from the standpoint of transporting and using the necessary explosives. These methods also present difficulties in controlling the effects of such a procedure.

Other suggestions for increasing the yield of existing wells entail heating the formation to induce the flow of hydrocarbons from the formation. Methods and apparatus have been developed by which various combustion devices have been lowered into the borehole of a well to attain heating of the formation adjacent the device. The effectiveness of such devices is limited by the necessity for fitting the devices into a borehole and then obtaining only more-or-less localized effects.

A combustion method designed to stimulate the well through mechanical fracture is known as controlled pulse fracturing or high energy gas fracturing. A good description of this method appears in an article by Cuderman, J. F., entitled "High Energy Gas Fracturing Development," Sandia National Laboratories, SAND 83-2137, October 1983. Using this method enables the multiple fracturing of a formation or reservoir in a radial manner which increases the possibility of contacting a natural fracture. Unfortunately, these radial fractures often do not penetrate deeply enough into the formation. Therefore, a method is needed which will extend the fractures deeper into the formation.

Sareen et al. in U.S. Pat. No. 3,896,879, disclose a method for increasing the permeability of a subterranean formation penetrated by at least one well which extends from the surface of the earth to the formation. This method comprises the injection of an aqueous hydrogen peroxide solution containing therein a stabilizing agent through said well into the subterranean formation. After injection, the solution diffuses into fractures of the formation surrounding the well. The stabilizing agent reacts with metal values in the formation which allows the hydrogen peroxide to decompose. Decomposition of hydrogen peroxide generates a gaseous medium causing additional fracturing of the formation.

Sareen et al. were seeking to enhance the radial propagation of the fracture into the formation around a wellbore. Also, Sareen et al. were seeking to provide a process for extending the fracture distance from the wellbore into the formation.

Using controlled pulse fracturing or high energy gas fracturing can generally cause multiple fracturing into the formation of about 50 to 75 feet. It is generally believed that using the method of Sareen et al. can cause fracturing into the formation of about 50 feet from the well or wellbore. However, this may be too optimistic as existing fractures may be too small to hold a volume of hydrogen peroxide sufficient to generate required fracturing pressure. Also some formations may not contain the metal values necessary to decompose the hydrogen peroxide. Often natural hydrocarbonaceous fluid fractures will occur at distances greater than 75 feet from the well or wellbore. Therefore, a method is needed to contact natural hydrocarbonaceous fluid fractures in those formations which have insufficient metal values to decompose hydrogen peroxide which occur at distances too far to be intersected or contacted with existing methods. Practicing the present invention allows the intersection or connection of natural hydrocarbonaceous fluid fractures at distances greater than heretofore possible while allowing hydrogen peroxide utilization in formations deficient in metal values.

SUMMARY OF THE INVENTION

This invention is a combination of a controlled pulse radial fracturing method and a hydrogen peroxide injection method for creating fractures in a subterranean formation or reservoir deficient in metal values required for the decomposition of hydrogen peroxide. Often neither method alone is sufficient to intersect natural hydrocarbonaceous fluid producing fractures at subtantial distances from the wellbore. Combining the two methods give unexpectedly good results in intersecting natural hydrocarbonaceous fluid producing fractures which are substantial distances away from the wellbore. By combining the two methods, radial fractures are produced by the controlled pulse fracturing method which fractures are sufficiently large enough to contain volumes of hydrogen peroxide greater than heretofore possible. Deteriorating hydrogen peroxide in these fractures generate pressures in the presence of metal values mixed with a proppant sufficient to enlarge and extend the fractures to a greater extent than previously believed possible.

In the practice of this invention, a means for fracturing, by a pressure loading rate sufficient to create multiple fractures, is placed in the well or wellbore near the productive interval. The peak pressure load is maintained sufficiently above the in-situ stress pressure but below the rock yield stress for a time sufficient to allow fluid penetration and extension of fractures.

Thereafter, a proppant containing metal values sufficient to decompose a hydrogen peroxide solution containing a stabilizing agent is injected into the fractures. Subsequently, a hydrogen peroxide solution containing a stabilizing agent and, which solution is of a strength sufficient to generate a pressure to fracture a formation, is injected into said formation. Upon contacting the formation, the stabilizing agent reacts with metal values mixed with the proppant. This reaction results in a substantial reduction of said agent in the hydrogen peroxide solution which causes it to become unstable. The resultant unstabilized hydrogen peroxide decomposes to form a gaseous medium which creates a pressure sufficient to fracture the formation and extend the fractures therein.

It is an object of this invention to create multiple radial fractures, near the wellbore and extend those fractures into a formation deficient in metal values necessary to decompose hydrogen peroxide.

It is yet another object of this invention to avoid damaging rock near the wellbore when creating multiple fractures.

It is still another object of this invention to create multiple fractures large enough to contain sufficient stabilized hydrogen peroxide which can decompose and generate pressure sufficient to extend the multiple fractures.

It is a further object of this invention to extend the multiple fractures into the formation for a distance sufficient to contact at least one natural hydrocarbonaceous producing fracture.

It is a still further object of this invention to obtain increased quantities of hydrocarbonaceous fluids.

It is a yet further object of ths present invention to increase the productivity of damaged wells by multiple fracturing.

DESCRIPTION OF THE PREFERRED EMBODIMENTS

In the preferred embodiment of this invention, it is desired to create multiple radial fractures into the wellbore or borehole and extend the fractures without crushing the wellbore or borehole. It is desired to create multiple extended radial fractures to enhance the possibility for recovering oil or hydrocarbonaceous fluids. To accomplish this a cannister containing a propellant is suspended into a wellbore. This cannister is placed downhole next to the oil or hydrocarbonaceous fluid productive interval.

The propellant in the cannister can belong to the modified nitrocellulose or the modified and unmodified nitroamine propellant class. Suitable solid propellants capable of being utilized include a double-based propellant known as N-5. It contains nitroglycerine and nitrocellulose. Another suitable propellant is a composite propellant which contains ammonium perchlorate in a rubberized binder. The composite propellant is known as HXP-100 and is purchasable from the Holex Corporation of Hollister, Calif. N-5 and HXP-100 propellants are disclosed in U.S. Pat. No. 4,039,030 issued to Godfrey et al. which is hereby incorporated by reference.

A M-5 solid propellant was utilized by C. F. Cuderman in an article entitled "High Energy Gas Fracturing Development," Sandia National Laboratories, *SAND* 83-2137, October 1983. This article is also incorporated by reference. High energy gas fracturing or controlled pulse fracturing is a method used for inducing radial fractures around a wellbore or borehole. Via this method a solid propellant-based means for fracturing is employed along with a propellant composed to permit the control of pressure loading sufficient to produce multiple fractures in a borehole at the oil or hydrocarbonaceous fluid productive interval. A peak pressure is generated which is substantially above the in-situ stress pressure but below the rock yield stress pressure.

After placing the propellant means for creating multiple fractures downhole near the oil or hydrocarbonaceous fluid productive interval, it is ignited. Ignition of the propellant means for creating the multiple fractures causes the generation of heat and gas pressure. As is known to those skilled in the art, the amount of heat and pressure produced is dependent upon the kind of propellant used, its grain size and geometry. Heat and pressure generation also depends upon the burning rate, weight of charge and the volume of gases generated.

Subsequently, the heat and pressure are maintained for a time sufficient to allow fluid penetration and extension of fractures. As is known, heat generation and pressure maintenance are dependent upon the nature of the formation and the depth it is desired to extend the fractures into the formation. After the heat and pressure have been maintained for a time sufficient to promote the desired fracturing, the heat and pressure dissipate into the formation surrounding the wellbore. The fractures which have been created are of a length and size necessary to hold a sufficient volume of hydrogen peroxide for pressure generation and extension of the fractures. However, in some formations, insufficient metal values are available for decomposing the hydrogen peroxide.

In order to overcome this deficiency and extend the radial fractures caused by the deflagration of the propellant, a proppant with metal values mixed therein is placed into the wellbore and formation. In addition to mixing the metal values with the proppant, the proppant can be coated with a selected metal compound, or ions thereof, prior to placing into the wellbore and formation. The proppant prevents the fractures from closing. Sufficient pressure is then applied to stabilized hydrogen peroxide subsequently injected into the wellbore which causes the stabilized hydrogen peroxide to enter the radial fractures caused by the deflagration of the M-5 propellant. Upon entrance into the formation, the stabilizer in the hydrogen peroxide breaks down in the presence of the metal values mixed with the proppant. Stabilizer breakdown is caused by the stabilizer's contact with metal values in the formation, e.g. iron.

Metal values which can be used in the practice of this invention include chemical compounds selected from metals such as iron, molybdenum, nickel, silver, platinum, gold and the like, and mixtures thereof. Other suitable metal values are readily recognizable by those skilled in the art. It is preferred to use iron compounds such as iron, pyrite and chalcopyrite. The concentration of the metal value utilized in or on the proppant will of course vary with the strength of the stabilized hydrogen peroxide and formation conditions. However, it is expected that the metal values will vary from about 0.5 wt. to about 10.0 wt. percent of the proppant, preferably about 5.0 wt. percent.

After the stabilizer has been substantially used up, the hydrogen peroxide begins to breakdown and forms pressure in the fracture. As the pressure increases it causes an extension of the radial fractures created by the controlled pulse fracturing procedure. Sareen et al. in U.S. Pat. No. 3,896,879, which is incorporated herein by reference, describe the chemical composition of a stabilized hydrogen peroxide mixture. Amino trimethylene phosphonic acid can be used as a stabilizing agent for the hydrogen peroxide. As is known to those skilled in the art, the quantity and concentration of hydrogen peroxide required will be dependent upon the nature of the formation, the number of radial fractures created and the sizes thereof, among others. The concentration of the hydrogen peroxide utilized is generally from about 30% to about 98% based on the total weight of said solution. The pH of the hydrogen peroxide solution will generally be less than about 6.0. As disclosed by Sareen et al., an organophosphorus compound can be used as a stabilizing agent for hydrogen peroxide. This organophosphorus compound will precipitate out of hydrogen peroxide when it comes into contact with metal values in the formation.

After the pressure has dissipated and it is determined that a natural oil producing fracture has not been intercepted or contacted by the extended radial fractures, an explosive slurry can be injected into the fractures created in the formation. This slurry should be placed into the formation at a depth or distance substantially away from the wellbore, so as to avoid damaging it. Once this has been accomplished, the explosive slurry is detonated. Pressures created by the detonation of the slurry will cause additional fracturing of hydrogen peroxide extended radial fractures. Explosive slurries which will work in the practice of this invention are known to those skilled in the art.

The effectiveness of fracturing at each stage of this method can be determined by available methods. One such method is described in U.S. Pat. No. 4,415,805 issued to Fertl et al. This patent is incorporated herein by reference. In this method a multiple stage formation fracturing operation is conducted with separate radioactive tracer elements injected into the well during each stage of the fracturing operation. After completion of the fracturing operation, the well is logged using natural gamma ray logging. The resulting signals are sorted into individual channels or energy bands characteristic of each separate radioactive tracer element. Results of the multiple stage fracturing operation are evaluated based on dispersement of the individual tracer elements.

In another embodiment of this invention, the location and direction of at least one natural hydrocarbonaceous fluid fracture is determined. This determination can be made by geologists and others skilled in the art. After the general location and direction of the natural fracture is determined, the well or wellbore is notched in a manner sufficient to direct pressure induced in the well in the direction of the natural fracture. Notching can be accomplished by methods known to those skilled in the art. One preferred method is the use of hydraulic pressure to cut notches into or near the hydrocarbonaceous production interval of the well. Another method which can be employed is the use of explosive projectiles. These projectiles can be fired into the well or wellbore wall at desired levels to create the desired notches.

After notching the well, a means for fracturing the formation by a pressure loading rate sufficient to create multiple fractures is placed into the well or wellbore substantially near the hydrocarbonaceous productive interval. Later, the in-situ stress pressures are determined. In-situ stress pressures are those pressures which occur naturally in an earth formation from hydraulic and heat sources. In-situ stress pressures are less than the pressures required to fracture rock in the formation.

As mentioned above, a propellant means for creating multiple fractures is placed in the well or wellbore substantially near the hydrocarbonaceous fluid productive interval and ignited. As is known to those skilled in the art, the pressure loading rate is the primary parameter for the production of multiple fractures. The loading rate required to produce multiple fractures is an inverse function of wellbore or borehole diameter. Hot gases are formed in the wellbore or borehole upon ignition of the propellant means creating a pressure. Gas pressurization of the cracks formed plays an important role during fracturing by inhibiting the formation of new cracks, and increasing the length of the existing cracks. As is known to those skilled in the art, the number and length of cracks is reduced when the rock yield stress is exceeded. When the rock yield stress is not exceeded by use of excessive wellbore peak pressure, the length of the longest cracks is increased.

After reaching the peak pressure load, it is maintained sufficiently above the in-situ stress pressure but below the rock yield stress pressure for a time sufficient to allow fluid penetration and extension of fractures. Once the pressure and heat have dissipated, a proppant containing metal values therein is injected into the formation. Afterwards, a hydrogen peroxide solution containing a stabilizing agent therein is forced into fractures in the formation. As mentioned above, the stabilizing agent reacts with metal values contained in said proppant which has been injected into the formation which causes the hydrogen peroxide to decompose and generate pressure, sufficient for further fracturing.

If a natural hydrocarbonaceous fracture has not been intersected, an explosive slurry can be pumped into the formation and detonated to create addition fracturing. Explosives which can be used are similar to those mentioned above.

Each step of this method can be repeated until at least one natural hydrocarbonaceous fracture has been intercepted or connected. Also, the order of the steps can be reversed for maximum fracturing effectiveness.

These embodiments are a combination of known methods for fracturing subterranean formations or reservoirs. As is known by those skilled in the art, neither method alone is adequate to connect or intersect natural hydrocarbonaceous fluid producing fractures located substantial distances from the wellbore. Combining the controlled pulse fracturing method in combination with hydrogen peroxide injection alone or in combination with explosive slurry injection produces enlarged and extended fractures. These enlarged and extended fractures can contain larger volumes of hydrogen peroxide or explosive slurry. Larger volumes of hydrogen peroxide or explosive slurry, properly utilized, can cause the generation of greater fracturing pressures than previously believed possible.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for fracturing a subterranean formation penetrated by at least one well which extends from the surface of the earth to the formation comprising:
   (a) placing into a well near the productive interval a means for fracturing the formation by a pressure loading rate sufficient to create multiple fractures;
   (b) maintaining the peak pressure load sufficiently above the in-situ stress pressure but below the rock yield stress for a time sufficient to allow fluid penetration and extension of fractures;

(c) inserting into said fractures, a proppant having mixed therein at least one metal value sufficient to react with stabilized hydrogen peroxide to form a gaseous medium; and (d) injecting a hydrogen peroxide solution containing a stabilizing agent into the fractures formed, which stabilizing agent reacts with metal values combined with said proppant resulting in a substantial reduction of said agent in the solution, and the resultant substantially unstabilized hydrogen peroxide decomposes to form a gaseous medium which expands and extends the fractures.

2. The method as recited in claim 1 where in step (a) the means for fracturing is a member selected from the group consisting of a modified nitrocellulose propellant, a modified nitro-amine propellant, an unmodified propellant, and a nitroglycerin and a nitrocellulose double-based propellant.

3. The method as recited in claim 1 where in step (a) the means for fracturing comprises an unmodified propellant.

4. The method as recited in claim 1 where in step (c) said metal value is a chemical compound selected from the group consisting of iron, molybdenum, nickel, silver, platinum, or gold, and mixtures thereof.

5. The method as recited in claim 1 where in step (c) said metal value is a member selected from the group consisting of iron pyrite or chalcopyrite or mixtures thereof combined with said proppant in an amount of from about 0.5 wt. percent to about 10.0 wt. percent, preferably about 5.0 wt. percent.

6. The method as recited in claim 1 where in step (a) the means for fracturing comprises an ammonium perchlorate composite propellant with a rubberized binder.

7. The method as recited in claim 1 where in step (d) amino trimethylene phosphonic acid is used as the stabilizing agent for the hydrogen peroxide.

8. The method as recited in claim 1 where in step (d) an organophosphorus compound is used as the stabilizing agent for the hydrogen peroxide.

9. The method as recited in claim 1 where in step (d) the concentration of the hydrogen peroxide is generally from about 30 weight percent to about 98 weight percent based upon the total weight of the hydrogen peroxide solution.

10. The method as recited in claim 9 where the pH of the hydrogen peroxide solution is generally less than about 6.0.

11. The method as recited in claim 1 where after step (d) an explosive slurry is pumped into the expanded fractures and detonated creating a force sufficient to further extend the fractures.

12. The method as recited in claim 1 where after step (d) an explosive slurry is pumped into the expanded fractures, the slurry is detonated creating a force sufficient to further extend the fractures, and this procedure is repeated until at least one natural hydrocarbonaceous fluid fracture is intersected.

13. The method as recited in claim 1 where before step (c) an explosive slurry is pumped into the expanded fractures and detonated creating a force sufficient to further extend the fractures.

14. The method as recited in claim 1 where before step (c) an explosive slurry is pumped into the expanded fractures, the slurry is detonated creating a force sufficient to further extend the fractures, and this procedure is repeated until at least one natural hydrocarbonaceous fluid fracture is intersected.

15. A method for fracturing a subterranean formation penetrated by at least one well which extends from the surface of the earth to the formation comprising:
(a) determining the direction of at least one natural hydrocarbonaceous fluid producing fracture substantially near the well;
(b) notching the well in a manner sufficient to direct induced pressure in the direction of the natural fracture;
(c) placing into a well near the productive interval a means for fracturing the formation by a pressure loading rate sufficient to create multiple fractures;
(d) maintaining the peak pressure load sufficiently above the in-situ stress pressure but below the rock yield stress for a time sufficient to allow fluid penetration and extension of fractures;
(e) inserting into said fractures, a proppant having mixed therein at least one metal value sufficient to react with stabilized hydrogen peroxide to form a gaseous medium; and
(f) injecting a hydrogen peroxide solution containing a stabilizing agent into the fractures formed, which stabilizing agent reacts with metal values combined with said proppant resulting in a substantial reduction of said agent in the solution, and the resultant substantially unstabilized hydrogen perioxide decomposes to form a gaseous medium which expands and extends the fractures.

16. The method as recited in claim 15 where in step (a) the means for fracturing comprises a member selected from the group consisting of a modified nitrocellulose propellant, a modified nitroamine propellant, an unmodified propellant, and a nitroglycerin and a nitrocellulose double-based propellant.

17. The method as recited in claim 15 where in step (a) the means for fracturing comprises an ammonium perchlorate composite propellant with a rubberized binder.

18. The method as recited in claim 15 where in step (e) said metal value is a chemical compound selected from the group consisting of iron, molybdenum, nickel, silver, platinum, or gold, and mixtures thereof.

19. The method as recited in claim 15 where in step (e) said metal value is a member selected from the group consisting of iron pyrite or chalcopyrite, or mixtures thereof, which is mixed with said proppant in an amount of from about 0.5 wt. percent to about 10.0 wt. percent, preferably about 5.0 wt. percent.

20. The method as recited in claim 15 where in step (f) amino trimethylene phosphonic acid is used as the stabilizing agent for the hydrogen peroxide.

21. The method as recited in claim 15 where in step (f) an organophosphorus compound is used as the stabilizing agent for the hydrogen peroxide.

22. The method as recited in claim 15 where in step (f) the concentration of the hydrogen peroxide is generally from about 30 weight percent to about 98 weight percent based upon the total weight of the hydrogen peroxide solution.

23. The method as recited in claim 15 where the pH of the hydrogen peroxide solution is generally less than about 6.0.

24. The method as recited in claim 15 where after step (f) an explosive slurry is pumped into the expanded fractures and detonated creating a force sufficient to further extend the fractures.

25. The method as recited in claim 15 where after step (f) an explosive slurry is pumped into the expanded fractures, the slurry is detonated creating a force sufficient to further extend the fractures, and this procedure is repeated until at least one natural hydrocarbonaceous fluid fracture is intersected.

26. The method as recited in claim 15 where before step (e) an explosive slurry is pumped into the expanded fractures and detonated creating a force sufficient to further extend the fractures.

27. The method as recited in claim 15 where before step (e) an explosive slurry is pumped into the expanded fractures, the slurry is detonated creating a force sufficient to further extend the fractures, and this procedure is repeated until at least one natural hydrocarbonaceous fluid fracture is intersected.

* * * * *